July 21, 1964 R. A. MAHAFFY ETAL 3,141,542
AUTOMATIC SWITCHING AND STORAGE CONVEYOR
Original Filed Sept. 2, 1958 2 Sheets-Sheet 1

INVENTORS
REID A. MAHAFFY,
JOHN R. HARDER,
BY Bailey, Stephens & Huetig
ATTORNEYS July 21, 1964   R. A. MAHAFFY ETAL   3,141,542
AUTOMATIC SWITCHING AND STORAGE CONVEYOR
Original Filed Sept. 2, 1958   2 Sheets-Sheet 2

INVENTORS
REID A. MAHAFFY,
JOHN R. HARDER,
ATTORNEYS

United States Patent Office 3,141,542
Patented July 21, 1964

3,141,542
AUTOMATIC SWITCHING AND STORAGE
CONVEYOR
Reid Alexander Mahaffy, Montclair, and John Richard Harder, Cedar Grove, N.J., assignors, by mesne assignments, to Speedco, Inc., Baltimore, Md., a corporation of Maryland
Original application Sept. 2, 1958, Ser. No. 758,186, now Patent No. 3,009,299, dated Nov. 21, 1961. Divided and this application July 20, 1959, Ser. No. 831,924
2 Claims. (Cl. 198—183)

This invention relates to an automatic switching and storage conveyor. In particular, the invention is directed to the transfer of slices of food from a food slicing and weighing machine to a packaging machine.

This application is a division of our copending application S.N. 758,186, filed September 2, 1958, for "Automatic Switching and Storage Conveyor," now Patent No. 3,009,299.

In the processing of sliced foods, such as luncheon meats, a loaf of meat is rapidly sliced, the slices collected into stacks and weighed, and placed on a conveyor for transfer to a packaging apparatus. For purposes of describing this invention, a food slicing machine is of the type shown in the copending application of Good, Serial No. 497,554, filed March 29, 1955 for "Food Slice Grouping Machine," or in the patent to Allbright No. 2,812,792. A packaging apparatus of the type used as an example in this case is a packaging machine as made and sold by the Standard Packing Corporation of New York, New York, and known under the trademark "Vacpack (6-12)."

The stacks or bundles of food slices coming from the platform of the automatic weighing scale must be sorted to eliminate stacks which are over and under a standard weight, and the stacks of correct weight delivered in an even flow to the packaging machine in proper register with the stack receiving cavities in the machine.

In the handling of cans and bottles, apparatuses are known for continuously handling such rigid and slidable articles from a supply source to automatic filling and packaging machines. However, the handling of uniform pieces, stacks or bundles of sticky, plastic, and/or structurally weak materials, including the switching and storage theerof, such as pieces of luncheon meat, has heretofore been done manually.

An object of this invention is to produce a transfer device for taking articles such as stacks of food slices or like materials from a single flow path and placing them in two or more paths according to a predetermined plan. Another object is to produce a storage device for retaining such materials in two or more parallel paths, to which paths the materials may be delivered intermittently at a certain rate and hold the material in the paths for moving them continuously forward at a uniform lesser rate which is preferably equal to the average rate at which the items are received by the transfer and storage device. Still another object is to produce a transfer device which will deliver the structurally weak materials from the paths without undue damage and without disarrangement of the slices in a bundle or stack. A further object of the invention is to deliver the stacks of slices in timed sequence and in proper registry with the packaging cavities in a packaging apparatus.

In general, these objects are accomplished by a switching device which grasps each stack as it is discharged from a conveyor coming from the weighing scales. This switching device is controlled by signals received from the weighing scale so that if any particular stack is over or underweight it is moved by the switching device and placed on a reject conveyor path. Stacks which are of acceptable weight are switched to two or more paths in alternate sequence, with this sequence being interrupted by the occurrence of an off-weight stack which is switched to the reject path.

The paths following the switching device are each composed of a series of endless conveyors. From the switching device, the individual groups are first received upon an endless chain belt transfer conveyor which assures positive removal of each group and then passes it onto a storage conveyor. This storage conveyor is also an endless belt having a surface formed of freely independently turnable rollers. Each stack therefor is moved forwardly on the roller conveyor, but when a bundle contacts a preceding bundle and is stopped, the roller conveyor continues to move with the stack being stationary while riding on the turnable individual rollers upon which the stack rests. This thus constitutes a storage conveyor on which the structurally weak materials are either moved or held stationary without damage to the stacks. Following, the stacks in the "material accepted" paths pass through a stack stopping and separating means or escapement means, and then between the reaches of an upper end lower conveyor, wherein the stacks are pushed into proper position for being received in register by the packaging apparatus.

The means by which the objects of the invention are obtained are disclosed more fully with reference to the accompanying drawings, in which.

Figure 1:
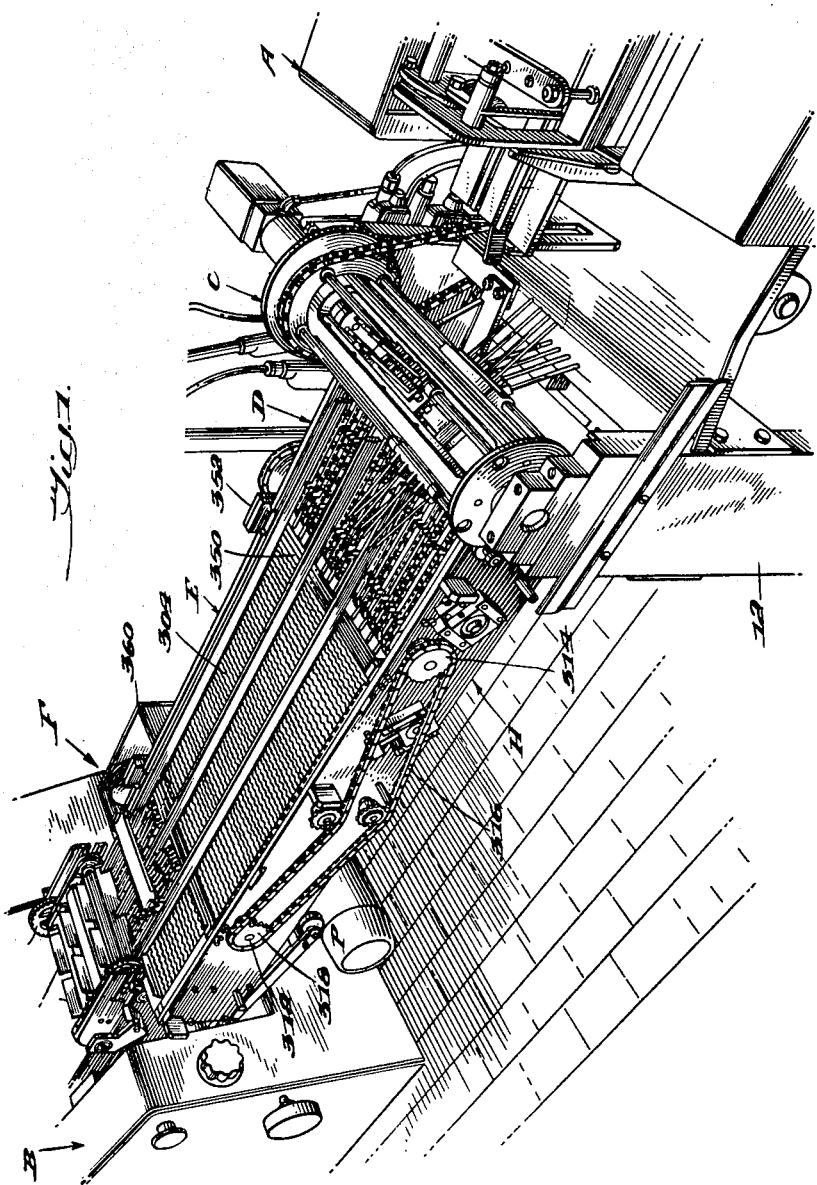
FIGURE 1 is a perspective view of the automatic switching and storage conveyor.
Figure 2:
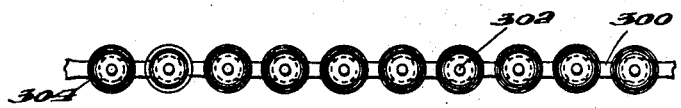
FIGURE 2 is an enlarged detailed view of a portion of the roller storage conveyor.
Figure 3:
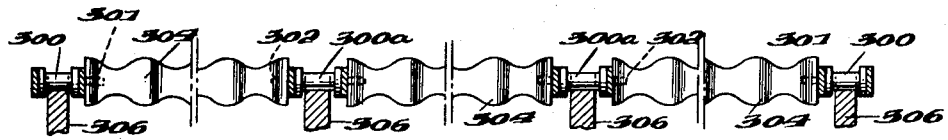
FIGURE 3 is a transverse view of FIGURE 2.

As shown in FIGURE 1, the food slicing, stacking and weighing machine A, as, for example, a machine shown in Good application Serial No. 497,554, now Patent No. 2,989,104, intermittently produces bundles or stacks of slices faster than they can be received and packaged in order by the packaging machine B, which may be the "Vacpack" machine referred to heretofore. The latter machine in essence consists of a cylinder having two rows of cavities in the periphery thereof for receiving the stacks to be packaged. The stacks coming from the slicing machine must therefore be ordered into two rows corresponding to the cavities in the packaging cylinder and must be fed to the packaging cylinder in registry with the position of the cavities. In addition, due to the lack of uniformity in the shape and density of the loaves of food being sliced, there is the likelihood of certain stacks being either over or under the allowable tolerances from a given weight, and such stacks must be rejected so that their weight can be corrected before they are packaged.

The automatic switching and conveying apparatus for accomplishing the proper transfer of the stacks of food from the slicing machine to the packaging machine is composed in general of an automatic switching device C which receives the stacks of food from the slicing machine and places them on a chain conveyor D which is separated into three rows, two of the rows being for stacks of satisfactory weight, and the third row being the rejection row. This chain conveyor moves the stacks of food in the rows onto a roller storage conveyor E which urges the stacks onward toward the packaging machine. Following the storage conveyor E is an escapement and delivery conveyor F which arranges the individual stacks into properly spaced positions so that they are delivered to the packaging machine in proper register with the cavities on the packaging cylinder by being pushed onto an advancing web of packaging material in machine B.

A frame H composed of two parallel beams is supported at one end by uprights 12 and the other end by wrapping machine B, and carries the conveyors D, E and F.

Storage conveyor E is composed of a plurality of endless sprocket chains 300 and 300a. The outermost chains 300 have their link pins 301 extended inwardly, while the intermediate chains 300a have their link pins 302 extended on both sides. Journalled on the pins between adjacent chains are a plurality of individually freely rotatable corrugated nylon rollers 304. At one end, the chains 300 and 300a are carried on sprockets mounted on a shaft and journalled in frame H. At the other end, adjacent packaging machine B, chains 300 and 300a are carried by sprockets mounted on shaft 312. The drive for chains 300 and 300a comes from a sprocket 314 mounted on shaft 210 and a sprocket chain 316 running to sprocket 318 on shaft 312. Thus shaft 312 is the drive shaft. Chains 300 and 300a are supported in tracks.

As chains 300 and 300a move, the food stacks are carried on the crests only of the corrugations on the nylon rollers 304. These rollers form the reject path, the center path, and the right side or alternate path, respectively. The number of stacks on the center and alternate paths waiting for further passage to packaging machine B, depends both upon the rate stacks are received from slicing machine A by switching device C, and the number of stacks which are eliminated by being placed on the reject path. As chains 300 and 300a urge the stacks along the paths, and as the movement of each stack is stopped temporarily by escapement register conveyor F, the stacks in each path will jam against each other. Damage to each stack is prevented because each roller 304 will revolve as a stack is stopped and thus the rollers pass under the stopped stacks with only a very slight frictional contact. Thus the stacks are only gently pushed together without damage.

To assist in the movement of the food stacks onto and off from storage conveyor E, a series of revolving transfer rollers is mounted at each end of conveyor E. As shown, three cylindrical rollers 350 are journalled in frame H with their top edges lying substantially in the plane of the upper surfaces of conveyors D and F. These rollers are connected to a gear train 352, the gearing being such that the peripheral speed of the rods approximates the linear speed of the adjacent conveyors. At the opposite end of conveyor E, are similar transfer rollers 360 which are driven from shaft 312 through a gear train.

In operation, conveyor D advances the stacks over rollers 350 onto storage conveyor E. If the number of stacks on the conveyor is more than can be immediately received in conveyor E, the stacks will jam together in a line in each path, but without damage as each stack will stop easily as the nylon rollers 304 revolve under the stack. To assist in the reducing of the effect of the friction between a stack and the rollers 304, it has been found helpful to incline frame H from 1° to 3° so that conveyor F is slightly elevated above conveyor D.

Ideally, the apparatus should be inclined to a position just below that where the stacks would begin to roll downwardly by gravity. In such a position, the slightest contact of a stack with a preceding stack is sufficient to cause the stack to stop and for the rollers 304 to begin to roll as they pass beneath the stack.

In the reject path, the rejected stacks are manually removed by an operator, their weight corrected by adding to or taking from the stack, and the corrected stack then placed on either the center or righthand alternate paths.

While the switching and storage conveyor composed of frame H supporting switching device C, and conveyors D, E and F, has been shown and described with reference to being powered by and timed with machines A and B, the invention includes the powering of the switching device and conveyors independent of associated feeding and receiving machines, in timed relation with respect thereto.

Having now described the means by which the objects of the invention are obtained,

We claim:

1. A storage conveyor for transferring structurally weak materials such as stacked slices of luncheon meat comprising a pair of parallel endless sprocket chains mounted upon sprockets, said chains having an upper reach and a lower reach, bearing pins fixed to said chains, corrugated surfaced nylon rollers journalled on said pins for forming a low friction non-lubricated bearing and said rollers being closely adjacent each other throughout the entire extent of said chains for supporting a single piece of material solely upon the crests of the corrugations of a plurality of rollers along the upper reach of the chain.

2. A storage conveyor as in claim 1, said chains being inclined at an angle to the horizontal of about from 1 to 3° and above which the piece of material would roll downwardly by gravity.

References Cited in the file of this patent

UNITED STATES PATENTS

| | | |
|---|---|---|
| 626,284 | Lyons et al. | June 6, 1899 |
| 1,200,775 | Stevenson | Oct. 10, 1916 |
| 1,215,596 | Westcott | Feb. 13, 1917 |
| 1,245,380 | Peters | Nov. 6, 1917 |
| 1,728,462 | Wyland | Sept. 17, 1929 |
| 1,867,522 | Noffsinger | July 12, 1932 |
| 2,296,645 | Marsden | Sept. 22, 1942 |
| 2,342,471 | Jampol | Feb. 22, 1944 |
| 2,775,793 | Cotchett | Jan. 1, 1957 |